(12) United States Patent
Hamm

(10) Patent No.: US 10,641,495 B2
(45) Date of Patent: May 5, 2020

(54) SMOKER ATTACHMENT FOR GAS GRILL

(71) Applicant: Justin Hamm, St. Cloud, FL (US)

(72) Inventor: Justin Hamm, St. Cloud, FL (US)

( * ) Notice: Subject to any disclaimer, the term of this patent is extended or adjusted under 35 U.S.C. 154(b) by 223 days.

(21) Appl. No.: 15/497,355

(22) Filed: Apr. 26, 2017

(65) Prior Publication Data
US 2017/0227232 A1 Aug. 10, 2017

Related U.S. Application Data

(60) Provisional application No. 62/327,527, filed on Apr. 26, 2016.

(51) Int. Cl.
*F24C 3/14* (2006.01)
*A47J 37/07* (2006.01)
*F24C 15/18* (2006.01)
*F24C 15/32* (2006.01)

(52) U.S. Cl.
CPC ............ *F24C 3/14* (2013.01); *A47J 37/0786* (2013.01); *F24C 15/18* (2013.01); *F24C 15/32* (2013.01)

(58) Field of Classification Search
CPC . A01G 13/06; F24C 3/14; F24C 15/18; F24C 15/32; F24C 1/02; F24C 1/16; A47J 37/0786; F24B 15/04
USPC ........................................ 126/41 R, 25 R, 29
See application file for complete search history.

(56) References Cited

U.S. PATENT DOCUMENTS

| | | | | |
|---|---|---|---|---|
| 371,152 A | * | 10/1887 | Stempel | F24C 3/14 126/260 |
| 664,894 A | * | 1/1901 | Porsch | A01G 13/06 126/59.5 |
| 740,650 A | * | 10/1903 | Heiland | A01G 13/06 126/59.5 |
| 1,938,645 A | * | 12/1933 | Swartz | A01G 13/06 126/59.5 |
| 2,212,157 A | * | 8/1940 | Fernholtz | A01G 13/06 126/25 B |

(Continued)

FOREIGN PATENT DOCUMENTS

JP          57000427 A  *  1/1982

OTHER PUBLICATIONS

"JP_57000427_A_M—Google Translate.pdf", Machine Translation, Google.com, Mar. 3, 2019.*

(Continued)

*Primary Examiner* — Steven B McAllister
*Assistant Examiner* — Daniel E. Namay
(74) *Attorney, Agent, or Firm* — Global Intellectual Property Agency, LLC; Daniel Boudwin

(57) ABSTRACT

A smoker attachment for a gas grill. The smoker attachment includes a housing having a base, a pair of opposing sidewalls, a rear wall, a front face defining an opening, and an interior volume. A tinder box having an interior volume for receiving fuel therein is removably insertable into the housing. An ash catcher having an interior volume for catching ash from the tinder box as the fuel combusts is removably insertable into the housing below the tinder box. A connector is disposed on a top wall of the housing, and a connecting hose attached to the connector is insertable into an interior enclosure of a gas grill. The connecting hose facilitates the transfer of smoke from the tinder box to the interior enclosure of the gas grill. The smoker attachment enables users to convert a conventional gas grill into a smoker.

16 Claims, 3 Drawing Sheets

(56) References Cited

U.S. PATENT DOCUMENTS

| | | | | |
|---|---|---|---|---|
| 2,478,281 A * | 8/1949 | Kurth | A01G 13/06 | 126/59.5 |
| 2,790,380 A * | 4/1957 | Shryack | A23B 4/052 | 99/331 |
| 3,205,885 A * | 9/1965 | Baxley | A01G 13/06 | 126/59.5 |
| 3,788,301 A * | 1/1974 | Terry | A01G 13/06 | 126/59.5 |
| 4,094,295 A * | 6/1978 | Boswell | A47J 37/0704 | 126/25 R |
| 4,643,162 A * | 2/1987 | Collins | A23B 4/052 | 126/41 R |
| 5,144,939 A * | 9/1992 | Christopherson | A01G 13/06 | 110/108 |
| 5,167,183 A * | 12/1992 | Schlosser | A47J 37/0713 | 126/25 R |
| 5,891,498 A * | 4/1999 | Boehler | A23B 4/052 | 426/314 |
| 6,039,039 A * | 3/2000 | Pina, Jr. | A23B 4/052 | 126/25 R |
| 6,095,132 A * | 8/2000 | Ganard | A23B 4/052 | 126/242 |
| 6,102,028 A * | 8/2000 | Schlosser | A47J 37/0786 | 126/25 R |
| 6,209,533 B1 * | 4/2001 | Ganard | A47J 37/0704 | 126/25 R |
| 6,257,130 B1 * | 7/2001 | Schlosser | A47J 37/0713 | 126/25 R |
| 6,708,604 B1 * | 3/2004 | Deichler, Jr. | A47J 37/0763 | 126/25 R |
| 6,739,331 B1 * | 5/2004 | Cohen | A47J 37/0786 | 110/108 |
| 8,230,848 B2 * | 7/2012 | Fou | A47J 37/07 | 126/25 R |
| 8,997,639 B2 * | 4/2015 | Adams | A23B 4/044 | 99/401 |
| 9,003,962 B2 * | 4/2015 | Broerman | A23B 4/044 | 99/481 |
| 9,179,799 B1 * | 11/2015 | Bourgeois | A23B 4/0523 | |
| 2006/0249036 A1 * | 11/2006 | Liu | A23B 4/044 | 99/511 |
| 2007/0028914 A1 * | 2/2007 | Galdamez | A23B 4/052 | 126/29 |
| 2008/0098906 A1 * | 5/2008 | Davis | A23B 4/044 | 99/482 |
| 2008/0268121 A1 * | 10/2008 | Karau | A47J 37/0704 | 426/523 |
| 2010/0206287 A1 * | 8/2010 | McLemore | A47J 37/0731 | 126/1 R |
| 2013/0239823 A1 * | 9/2013 | Re | A23B 4/044 | 99/474 |
| 2013/0319256 A1 * | 12/2013 | Piazzi | A47J 37/0704 | 99/341 |
| 2014/0261016 A1 * | 9/2014 | Kaderli | A23B 4/0523 | 99/473 |
| 2015/0136113 A1 * | 5/2015 | Polter | A47J 37/07 | 126/25 R |
| 2015/0245740 A1 * | 9/2015 | Garcia | A47J 37/0704 | 126/25 A |
| 2016/0100594 A1 * | 4/2016 | Barber | A23B 4/052 | 99/481 |
| 2016/0174766 A1 * | 6/2016 | Schlosser | A47J 37/0704 | 126/25 R |
| 2016/0220066 A1 * | 8/2016 | Roberts | A47J 37/0786 | |
| 2017/0227232 A1 * | 8/2017 | Hamm | F24C 3/14 | |

OTHER PUBLICATIONS

"JP_57000427_A_Machine Translation 1.pdf", Machine Translation, JPlat Japan Platform for Patent Information, Mar. 4, 2019.*

"JP_57000427_A_Machine Translation 2.pdf", Machine Translation, EPO.org, Mar. 4, 2019.*

* cited by examiner

SMOKER ATTACHMENT FOR GAS GRILL

CROSS REFERENCE TO RELATED APPLICATIONS

This application claims the benefit of U.S. Provisional Application No. 62/327,527 filed on Apr. 26, 2016. The above identified patent application is herein incorporated by reference in its entirety to provide continuity of disclosure.

FIELD OF THE INVENTION

The present invention relates to smoker attachments. More specifically, the present invention provides a smoker attachment for a gas grill that enables individuals to convert a conventional gas grill into a smoker.

BACKGROUND OF THE INVENTION

One popular way of preparing meats and other foods is to apply heat and smoke to the food for a continuous period. This process, referred to as "smoking", utilizes low heat to cook the food while the smoke imparts a desirable flavor. Food is typically smoked in a dedicated smoker device. However, these devices can be prohibitively expensive and difficult to assemble and use.

While few individuals have a dedicated smoker, many individuals utilize a gas grill to prepare foods. Some individuals attempt to impart a smoky flavor to the food by placing an open container of a smoke source such as wood chips onto the cooking surface of the grill. While this can impart the food with a smoky taste, the container takes up valuable space on the grill's cooking surface. Further, the heat imparted to the wood chips can reduce the heat provided to the food, slowing or impairing the cooking process. In light of the above concerns, there is need in the art for a smoker attachment for a gas grill that attaches to the exterior of a gas grill and directs smoke into the interior cooking area of the grill, imparting a smoky flavor to foods prepared therein.

Devices have been disclosed in the known art that relate to smoker attachments. These include devices that have been patented and published in patent application publications. However, the devices in the known art have several drawbacks. These devices are typically secured within the interior of the gas grill cooking area, which takes up cooking space. Additionally, these devices tend to be costly because they include complicated construction including various baffles and channels to direct the smoke.

In light of the devices disclosed in the known art, it is submitted that the present invention substantially diverges in design elements from the known art and consequently it is clear that there is a need in the art for an improvement to existing smoker attachment devices. In this regard the present invention substantially fulfills these needs.

SUMMARY OF THE INVENTION

In view of the foregoing disadvantages inherent in the known types of smoker attachments now present in the prior art, the present invention provides a smoker attachment for a gas grill wherein the same can be utilized for providing convenience for the user when converting a conventional gas grill into a smoker.

An embodiment of the present smoker box includes a housing having a base, a pair of opposing sidewalls, a rear wall, a front face defining an opening, and an interior volume. A tinder box including a base, a plurality of sidewalls, an open upper end, and an interior volume for receiving fuel therein is removably insertable into the interior volume of the housing. An ash catcher including a base, a plurality of sidewalls, an open upper end, and an interior volume for collecting ash from the tinder box is removably insertable into the interior volume of the housing below the tinder box. A connector disposed on a top wall of the housing includes a channel in fluid communication with the interior volume of the housing. A connecting hose attached to the connector is insertable into an interior enclosure of a gas grill. The connecting hose facilitates the transport of smoke from the tinder box to the interior enclosure of the gas grill, such that the smoke can impart a desirable flavor to foods prepared on the gas grill.

One object of the present invention is to provide a smoker attachment for a gas grill that enables users to convert a conventional gas grill into a smoker.

Another object of the present invention is to provide a smoker attachment for a gas grill that includes mounting brackets configured to secure the smoker attachment to the exterior of the gas grill.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
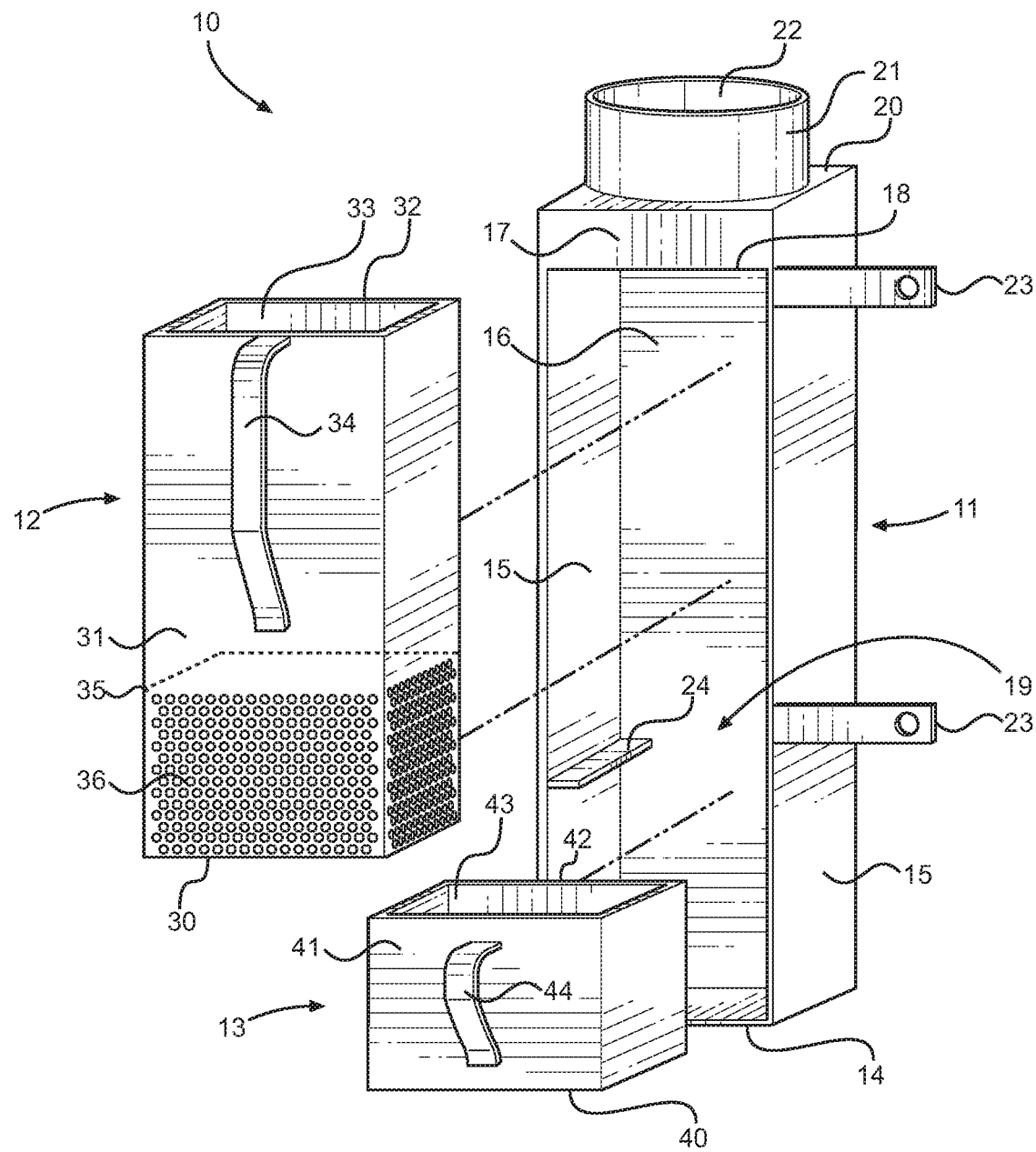
FIG. 1 shows an exploded view of the smoker attachment.

Reference is made herein to the attached drawings. Like reference numerals are used throughout the drawings to depict like or similar elements of the smoker attachment. For the purposes of presenting a brief and clear description of the present invention, the preferred embodiment will be discussed as used for converting a conventional gas grill into a smoker. The figures are intended for representative purposes only and should not be considered to be limiting in any respect.

Referring now to FIG. 1, there is shown an exploded view of the smoker attachment. The smoker attachment 10 includes a housing 11, a tinder box 12, and an ash catcher 13. The housing 11 supports the tinder box 12 and the ash catcher 13 and is securable to the exterior of a gas grill. The housing 11 includes a base 14, a pair of opposing sidewalls 15, and a rear wall 16 extending upwardly from the base 14. A front face 17 extends across an upper portion of the opposing sidewalls 15. The front face 17 includes an opening 18 providing access to an interior volume 19 of the housing 11. The opening 18 extends longitudinally along the front face 17 between an upper end of the housing 11 and the base 14 and laterally between the pair of opposing sidewalls 15. The housing 11 is securable to an exterior of a gas grill via brackets 23 disposed thereon. In the illustrated embodiment, the brackets 23 are disposed on one of the plurality of sidewalls 15 and are oriented perpendicular thereto. The brackets 23 include apertures configured to receive fasteners therethrough for fastening the housing 11 to the exterior of a gas grill.

The tinder box 12 includes a base 30 having a plurality of sidewalls 31 extending upwardly therefrom. The plurality of sidewalls 31 terminate at an open upper end 32 which provides access to an interior volume 33. The interior volume 33 is adapted to receive fuel for producing smoke therein, such as wood chips, wood pellets, or any other combustible material that produces flavorful smoke when burned. A plurality of apertures 36 are disposed on a lower end 35 of each of the plurality of sidewalls 31. The plurality apertures 36 facilitate combustion of the fuel by allowing air to flow into the interior volume 33.

The tinder box 12 is removably insertable into the interior volume 19 of the housing 11. In the illustrated embodiment, a handle 34 is disposed on the tinder box 12 for facilitating insertion and removal of the tinder box 12. The tinder box 12 is supported by a flange 24 disposed within the interior volume 19, such that the tinder box 12 is suspended at a fixed distance above the base 14 of the housing 11. In the depicted embodiment, the flange 24 includes a flat projecting member extending along the width of a sidewall 15 and projecting laterally inwardly with respect to the interior volume of the housing 11.

The ash catcher 13 includes a base 40 and a plurality of sidewalls 41 extending upwardly therefrom. The plurality of sidewalls 41 terminate in an open upper end 42 which provides access to an interior volume 43. The interior volume 43 of the ash catcher is configured to receive ash and debris that falls from the tinder box 12.

The ash catcher 13 is removably insertable into the interior volume 19 of the housing 11. In the illustrated embodiment, a handle 44 is disposed on the ash catcher 13 for facilitating insertion and removal of the ash catcher 12. The ash catcher 13 is supported by the base 14 of the housing 11. The ash catcher 13 is positioned below the tinder box 12, such that ash falling through the apertures 36 of the tinder box 12 can be collected within the interior volume 43 of the ash catcher 13. The ash catcher 13 may be removed from the housing 11 and emptied when it is filled with ash. In the illustrated embodiment, the tinder box 12 comprises a height that is greater than a height of the ash catcher 13.

The housing 11 further includes a top wall 20 having a connector 21 thereon. The connector 21 includes a channel 22 that is in fluid communication with the interior volume 19 of the housing 11. The connector 21 is configured to removably engage a connecting hose via frictional engagement therewith in order to transport smoke from the tinder box 12 to the interior of a gas grill.

Figure 2:
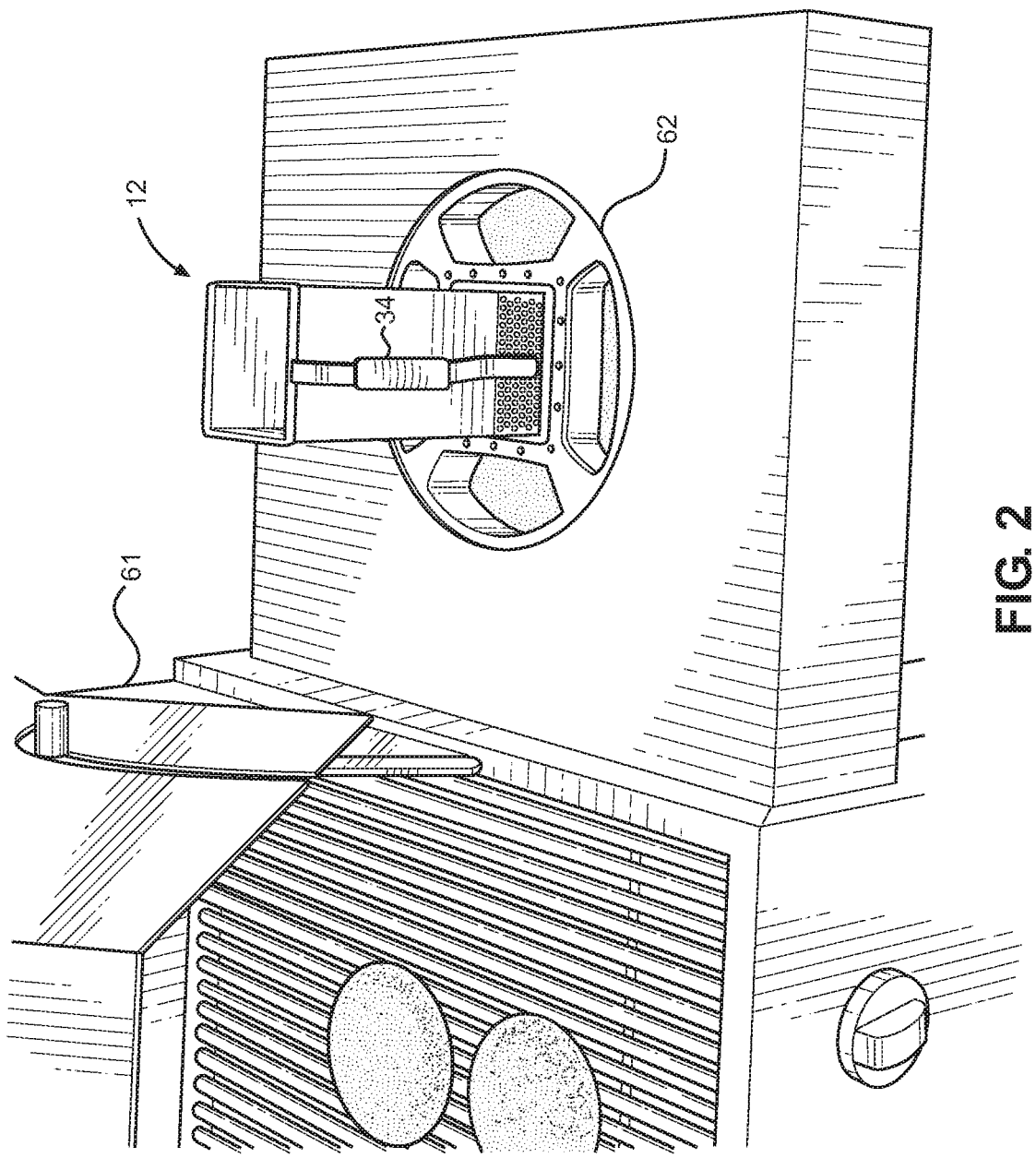
FIG. 2 shows a perspective view of the tinder box component of the smoker attachment supported on a side burner of a gas grill.

Referring now to FIG. 2, there is shown a perspective view of the tinder box component of the smoker attachment supported on a side burner of a gas grill. Gas grills typically include a side burner 62 disposed adjacent to the grilling chamber 61. The side burner can be utilized to ignite the fuel held within the tinder box 12. The user may grasp the handle 34 of the tinder box 12 when placing the tinder box 12 on the side burner 62 and when removing it therefrom. The handle 34 may include a heat resistant material thereon so that the user may comfortably and safely grasp the handle 34 once the fuel within the tinder box 12 is burning.

Figure 3:
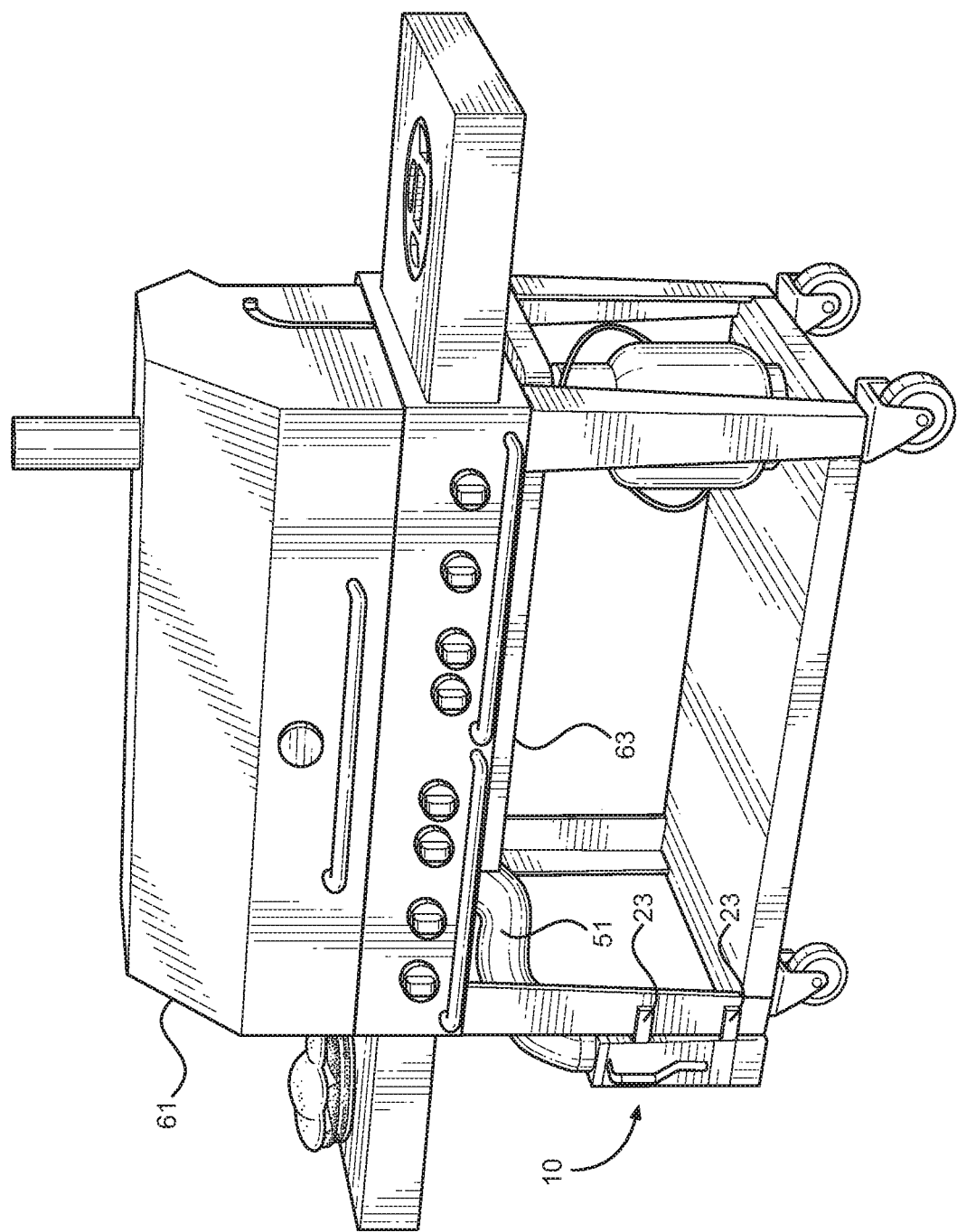
FIG. 3 shows a perspective view of the smoker attachment attached to the exterior of a gas grill.

Referring now to FIG. 3, there is shown a perspective view of the smoker attachment attached to the exterior of a gas grill. The brackets 23 secure the smoker box 10 to the exterior of the gas grill. The connecting hose 51 is removably secured to the smoker box 10 and extends from the smoker box 10 through a lower end 63 of the grilling chamber 61. Smoke from the smoker box 10 is transported to the grilling chamber 61 by flowing upwardly through the connecting hose 51. In this way, food prepared in the grilling chamber 61 is infused with a smoky flavor, allowing an individual to convert a typical gas grill into a smoker.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A smoker attachment, comprising:
   a housing comprising a base, a pair of opposing sidewalls, a rear wall, and a front face including an opening providing access to a first interior volume;
   a tinder box comprising a base, one or more apertures, a plurality of sidewalls, and an open upper end providing access to a second interior volume for receiving fuel therein, wherein the tinder box is removably insertable into the first interior volume of the housing;
   a tinder box handle disposed on one sidewall of the plurality of sidewalls of the tinder box to facilitate insertion or removal of the tinder box, wherein the tinder box handle includes an upper end affixed to an upper edge of one of the plurality of sidewalls of the tinder box and a lower end affixed to one of the plurality of sidewalls of the tinder box above the one or more apertures of the tinderbox;
   an ash catcher comprising a base, a plurality of sidewalls, an ash catcher handle disposed on one of the plurality of sidewalls of the ash catcher, and an open upper end providing access to a third interior volume, wherein the ash catcher is removably insertable into the first interior volume of the housing, wherein the ash catcher is configured to receive and store ash that falls through the one or more apertures on the tinder box;
   a connector disposed on a top wall of the housing, the connector comprising a channel in fluid communication with the first interior volume of the housing;
   a connecting hose having a first end attached to the connector, wherein a second end of the connecting hose extends through a lower end of a grilling chamber of a gas grill, such that the interior volume of the smoker attachment housing is in fluid communication with the interior enclosure of the gas grill.

2. The smoker attachment of claim 1, wherein the housing comprises one or more brackets disposed thereon, wherein the brackets are configured to secure the housing to an exterior portion of a gas grill.

3. The smoker attachment of claim 2, wherein the one or more brackets are disposed on a first sidewall of the pair of opposing sidewalls, wherein the one or more brackets are oriented perpendicular to the first sidewall.

4. The smoker attachment of claim 1, wherein the tinder box comprises a plurality of apertures disposed on a lower end of each of the plurality of sidewalls.

5. The smoker attachment of claim 1, wherein the ash catcher handle includes an upper end affixed to an upper edge of one of the plurality of sidewalls of the ash catcher and a lower end affixed to one of the plurality of sidewalls of the ash catcher.

6. The smoker attachment of claim 1, wherein the ash catcher is supported by the base of the housing.

7. The smoker attachment of claim 1, wherein the tinder box is supported by a flange disposed within the interior volume of the housing.

8. The smoker attachment of claim 1, wherein the connecting hose is removably securable to the connector via frictional engagement therewith.

9. The smoker attachment of claim 1, wherein the tinder box comprises a height that is greater than a height of the ash catcher.

10. A gas grill assembly, comprising:
a grilling enclosure disposed on a supporting frame;
a smoker attachment comprising a base, a pair of opposing sidewalls, a rear wall, and a front face including an opening providing access to a first interior volume;
a tinder box comprising a base, a plurality of sidewalls, and an open upper end providing access to a second interior volume for receiving fuel therein, wherein the tinder box is removably insertable into the first interior volume of the smoker attachment;
a tinder box handle disposed on one sidewall of the plurality of sidewalls of the tinder box to facilitate insertion or removal of the tinder box, wherein the tinder box handle includes an upper end affixed to an upper edge of one of the plurality of sidewalls of the tinder box and a lower end affixed to one of the plurality of sidewalls of the tinder box above the one or more apertures of the tinder box;
an ash catcher comprising a base, a plurality of sidewalls, an ash catcher handle disposed on one sidewall of the plurality of sidewalls of the ash catcher, and an open upper end providing access to a third interior volume, wherein the ash catcher is removably insertable into the first interior volume of the smoker attachment, wherein the ash catcher is configured to receive and store ash that falls through one or more apertures disposed on the tinder box;
a connector disposed on a top wall of the smoker attachment, the connector comprising a channel in fluid communication with the first interior volume of the smoker attachment;
a connecting hose having a first end attached to the connector, wherein a second end of the connecting hose extends through a lower end of the grilling enclosure, such that the first interior volume of the smoker attachment is in fluid communication with an interior volume of the grilling enclosure.

11. The gas grill assembly of claim 10, wherein the tinder box comprises a plurality of apertures disposed on a lower end of each of the plurality of sidewalls.

12. The gas grill assembly of claim 10, wherein the ash catcher handle includes an upper end affixed to an upper edge of one of the plurality of sidewalls of the ash catcher and a lower end affixed to one of the plurality of sidewalls of the ash catcher.

13. The gas grill assembly of claim 10, wherein the ash catcher is supported by the base of the smoker attachment.

14. The gas grill assembly of claim 10, wherein the tinder box is supported by a flange disposed within the interior volume of the smoker attachment.

15. The gas grill assembly of claim 10, wherein the connecting hose is removably securable to the connector via frictional engagement therewith.

16. The gas grill assembly of claim 10, wherein the tinder box comprises a height that is greater than a height of the ash catcher.

* * * * *